Aug. 7, 1962 D. H. POLZIN 3,048,304
FERTILIZER DISTRIBUTOR WITH LEVEL
RESPONSIVE FLOW ADJUSTMENT
Filed Sept. 2, 1958 3 Sheets-Sheet 2
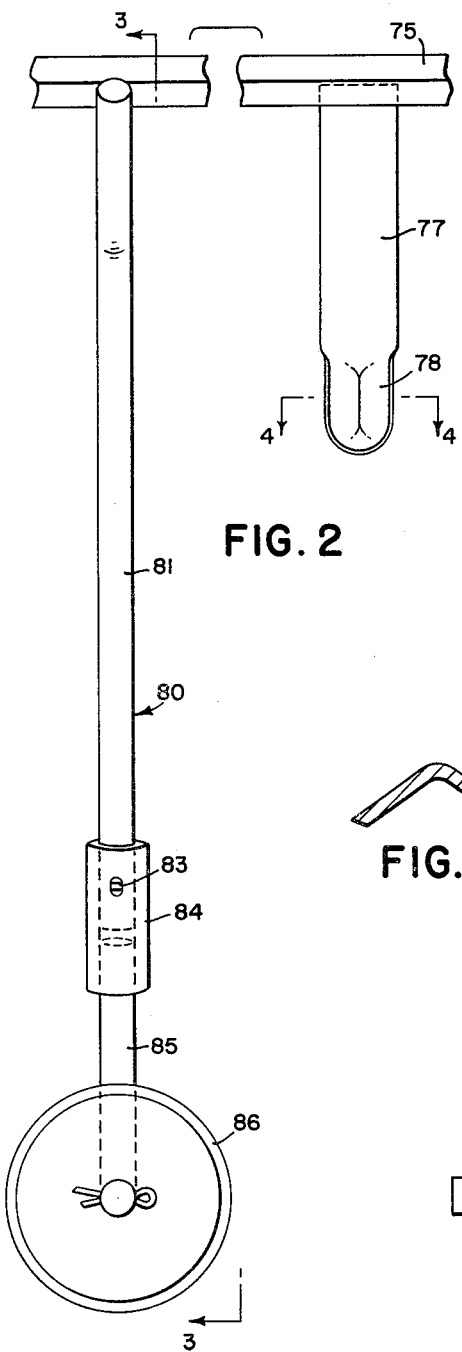
FIG. 2
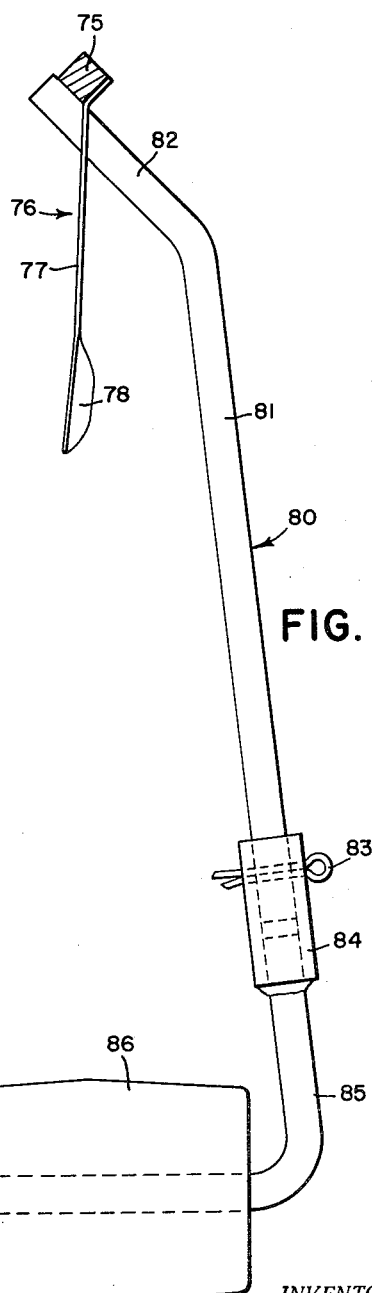
FIG. 3
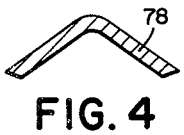
FIG. 4
INVENTOR.
DONALD H. POLZIN
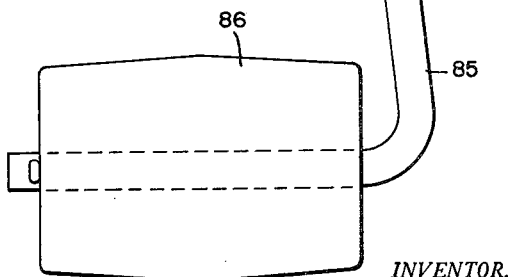
ATTORNEYS United States Patent Office 3,048,304
Patented Aug. 7, 1962

3,048,304
FERTILIZER DISTRIBUTOR WITH LEVEL
RESPONSIVE FLOW ADJUSTMENT
Donald H. Polzin, Horicon, Wis., assignor to Deere &
Company, Moline, Ill., a corporation of Delaware
Filed Sept. 2, 1958, Ser. No. 758,376
7 Claims. (Cl. 222—162)

The present invention relates generally to agricultural implements and more particularly to fertilizer distributors and the like.

The object and general nature of this invention is the provision of a new and improved fertilizer distributor in which fertilizer is distributed from a hopper that is provided with means that varies the flow of fertilizer with changes in the level of the hopper. Specifically, according to this invention, means is provided for delivering fertilizer through one of the walls of the hopper under the action of gravity without packing or compressing the fertilizer, with additional means that offsets the tendency of the fertilizer to flow more rapidly when moving downhill and to be delivered in reduced quantities when going uphill.

These and other objects and advantages of the present invention will be apparent to those skilled in the art after a consideration of the following detailed description taken in conjunction with the accompanying drawings, in which:

FIG. 2 is a detailed elevational view of the level responsive fertilizer flow diverter.

FIG. 3 is a section taken generally along the line 3—3 of FIG. 2.

FIG. 4 is an enlarged section taken along the line 4—4 of FIG. 2.

FIG. 7 is a fragmentary detail view of the spout support.

Figure 1:
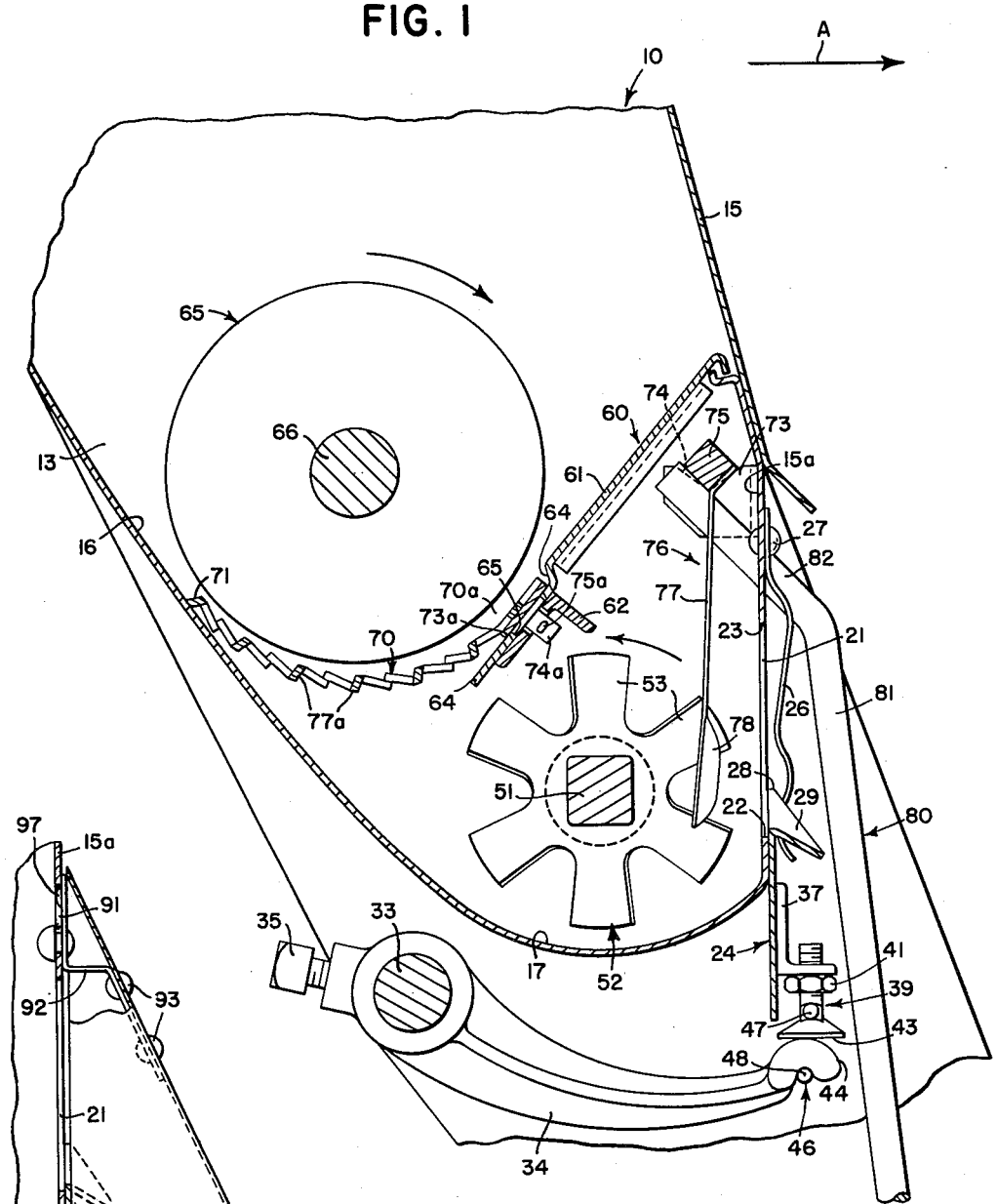
FIG. 1 is a transverse sectional view taken through the hopper of the fertilizer distributor in which the principles of the present invention have been incorporated, the hopper being shown in its normal or horizontal position.

Referring first to FIG. 1, the principles of this invention have been shown as incorporated in a fertilizer distributor 10 that may be carried by the rear portion of a grain drill. The distributor 10 includes a fertilizer hopper 13 having front wall means 15 and rear wall means 16 spaced apart in a fore-and-aft extending direction. The bottom wall of the fertilizer hopper 13 is indicated at 17 and forms a rounded portion that is joined smoothly with and serves as an integral part of the rear wall means 16. The lower portion of the front wall means, as indicated at 15a, is disposed generally vertically and is provided with a plurality of outlets 21, each having a lower edge 22 and an upper edge 23. The openings 21 are spaced apart longitudinally of the hopper 13 and are disposed well above the bottom 17 of the hopper.

Disposed along the apertured front wall means 15a is an elongated substantially flat vertically adjustable slide or gate 24 that lies substantially flat against the vertical forward or outer face of the front wall section 15a. A plurality of springs 26 are anchored, as by rivets 27, at their upper ends to the front wall means and at their lower ends bear against the slide 24 for the purpose of holding it snugly against the forward face of the apertured front wall portion. The springs 26, while holding the slide or gate in position, also accommodate vertical movement of the slide so as to raise or lower the upper edge 28 of the slide relative to the openings 21. At each opening 21 the gate 24 has a discharge lip 29.

The means for raising or lowering the gate or slide 24 relative to the hopper comprises a shaft 33 that is supported in any suitable way along the bottom of the hopper. The shaft 33 carries a plurality of arms 34 that are fixed to the shaft 33 by set screw means 35 or the like. A hand lever (not shown) is fixed to one end of the shaft 33 for rocking the latter to raise and lower the slide or gate 24.

A plurality of angle brackets 37 are fixed in spaced apart relation along the lower portion of the slide 24, and each bracket 37 is tapped to receive an associated screw threaded adjusting member 39. Each of these members carries a lock nut 41 which, when tightened, serves to fix the adjusting member 39 in position relative to the slide or gate 24. The head of each of the members 39 is disposed in a downwardly facing position and is substantially flat, as indicated at 43. The flat head 43 serves as arm-receiving means that is adapted to be engaged by the curved portion 44 at the outer end of the associated arm 34. A spring locking pin 46 having upper and lower link sections 47 and 48 serves as resilient means operatively connecting each arm 34 with the associated adjusting member 39. The locking pins 46 act to continually hold the cam or curved portion 44 of each arm 33 against the arm receiving surface 43, whereby movement imparted by the hand lever to the rockshaft 33 is transmitted to the gate 24 so as to cause proportional adjustment thereof with substantially no lost motion. The degree of adjustment provided by the screw threaded members 39 and associated parts is much finer than would be possible if adjustment of the arms 34 on the rockshaft 33, as by loosening the set screws 35 and repositioning the arms 34, were relied upon.

A shaft 51 is disposed for rotation in the lower portion of the hopper and carries a plurality of spaced apart feed or impeller wheels 52. Each of the impeller or feed wheels 52 is formed with angled paddle-like vanes 53, and the path of movement of the wheels 52 lies well above the bottom of the hopper so that there is no tendency for the wheels to compress fertilizer material or cause the latter to build up on the bottom of the hopper. The shaft 51 is rotated to carry the feeder wheels 52 in the direction of the arrow, whereby, in effect, the wheels 52 serve to sweep fertilizer from the bottom of the hopper and lift it or carry it upwardly to points where, under the action of gravity, it spills out over the lips along the upper edge 28 of the gate 24.

In its normal position, the gate 24 serves as a dam whereby fertilizer fed into the bottom of the hopper is retained for a time in the bottom of the hopper and is kept in a loose or fluffy condition by the rotation of the feeder wheels 52. The lower the gate 24, the greater the amount of fertilizer that falls outwardly through the openings 21, and the higher the gate, the smaller the quantity thus delivered.

A baffle 60 is disposed in the hopper 11 and has its upper forward edge connected in a suitable way to the front wall means 15. The baffle 60 extends downwardly and rearwardly from the front wall 15 over the feed wheels 52. The baffle 60 includes an imperforate plate 61 and a transversely extending member 62 is welded or otherwise permanently fixed to the rear or lower edge of the baffle plate 61 so as to form a part thereof. The member 62 is supported in any suitable way in the hopper. The rear or lower edge of the plate 61 is offset downwardly as indicated at 64 and is apertured, as at 65, to receive fastening means described below. The member 62 is similarly apertured.

Disposed above and to the rear of the baffle 60 is an agitator 65 that, so far as this invention is concerned, may be of any suitable construction. The agitator 65 moves in the direction of the arrow shown in the upper portion of FIG. 1 and serves to keep the material in the upper part of the hopper in a loose condition. Disposed immediately underneath the agitator 65 is a perforated plate in the form of a curved strip of expanded metal indicated generally at 70. The rear or outer edge of the strip, as indicated at 71, lies against the rear wall 16 of the hopper and the forward edge of the expanded metal strip 70 is fixed rigidly to a flat bar 73a on which studs 74a are carried. These studs extend downwardly through the baffle openings 65 and also through similar openings formed in the downwardly angled flange of the supporting member 62. Suitable retaining hairpin springs 75a or the like serve to fix both the lower edge of the baffle 61 and the forward edge of the expanded metal strip 70 in place in the hopper. It will be noted from FIG. 1 that the interconnecting web sections 77a of the expanded metal strip are disposed generally edgewise with respect to the path of rotation of the agitator 65. It will also be noted that the forward or upper portion 70a of the expanded metal strip 70 lies at a slightly greater distance from the path of movement of the agitator bars than does the rear or wall-supported portion 71 of the strip 70. The greater spacing thus is at the upstream point relative to the direction of rotation of the agitator 65, and this arrangement cooperates with the edgewise disposition of the expanded metal web sections 77a so that lumps and other hardened masses of fertilizer are broken and disintegrated by the rotattion of the agitator 65, whereby fertilizer that passes through the screen 70 into the lower portion of the hopper is fairly finely granulated and no large lumps or masses are present to interfere with the action of the feed wheels 52. As mentioned above, the feed wheels or impeller wheels 52 keep the fertilizer in the lower portion of the hopper loose and from FIG. 1 it will be seen that the rotation of the impeller wheels acts to deliver the fertilizer from a point where it flows downwardly past the lower edge of the baffle plate 61 across the bottom of the hopper and then upwardly to a point where it falls over the upper edge or lip portions of the gate 24.

As mentioned above, the lower the position of the gate 24 the greater the amount of fertilizer that is delivered over the upper edge 28 of the gate, and the higher the position of the gate the smaller the amount of fertilizer thus delivered. It will be seen, therefore, that in a fertilizer distributor of this type, there is maintained in the lower portion of the hopper a quantity of fertilizer that is constantly available to fall under the action of the gravity over the gate 24 and which is constantly replaced by fertilizer moving down over the edge of the baffle 60 and through the screen 70, the quantity moving down thus being only that which is necessary to replace fertilizer removed from the lower portion of the hopper under the action of the impeller wheels 52. It will also be seen from FIG. 1 that in most of the positions of the gate 24, except the lowermost positions, the upper edge of the gate lies more or less at about the same level as the lower edge 64 of the baffle plate 61. In an arrangement of this kind, it will be seen that when the outfit moves across a substantially level field, the hopper is in its level position and the fertilizer maintained in the lower portion of the hopper is also approximately level. However, if the grain drill should be driven uphill at an appreciable angle, the upper edge of the gate 24 occupies a slightly higher position, relative to the more or less level mass of fertilizer in the lower portion of the hopper. Conversely, when the grain drill is driven downhill at an appreciable angle, the upper edge of the gate occupies a relatively lower position with respect to the approximately level fertilizer in the lower portion of the hopper. Thus, there is a tendency for fertilizer to be discharged at a greater rate when going downhill and at a reduced rate when going uphill, as compared with the desired rate, which is determined by the position of the gate 24 when the grain drill is operated on substantially level ground.

As explained above, when the fertilizer distributor, the normal direction of travel of which is indicated by the arrow A (FIG. 1), is driven uphill, for example, the hopper is no longer level and the upper edge 28 of the gate 24 is disposed in a slightly higher position, relative to the shaft 51, than would be the case when the outfit is moved over level ground. This will normally result in a reduced rate of fertilizer flow over the gate 24. The reverse is true when the implement is driven downhill.

According to my invention, I provide means responsive to variations in the position of the hopper from the horizontal for varying the rate of delivery of fertilizer by the impeller wheels toward the discharge outlets, thus automatically compensating for changes in the operating position of the fertilizer distributor so that when going downhill the rate of fertilizer delivery is reduced, and in going uphill the rate of delivery is automatically increased, over what it would otherwise be without my invention. Thus, the end result is that the amount of fertilizer actually discharged from the hopper remains substantially constant, whether operating over level ground or going up and down hill. Such means will now be described.

Disposed in the upper forward portion of the lower part of the hopper is a diverter shaft 75 rockably supported by notched brackets 73, the notches 74 being angled to accommodate rocking of the shaft 75, which is square in cross section, with a sort of knife edge action. The brackets 73 are fixed to the inner face of the front wall 15a. Fixed to the shaft 75 is a plurality of diverter members 76, one for each of the openings 21. Each of the members 76 includes depending arm section 77 and a lower fertilizer engaging vane portion 78 that, as best shown in FIG. 4, is approximately V-shaped in section. The vane portion 78 is disposed to lie in between the impeller or feed wheels 52 and is disposed substantially in front of the associated opening 21. In the level or normal position of the fertilizer distributor, the diverters 76 are disposed with the lower portions 78 thereof about half-way between the shaft 51 and the openings 21, so that in operation a portion of the fertilizer coming down through the screen 70 and brought around across the bottom of the hopper by the impeller wheels, is recirculated, as shown in FIG. 1.

For rocking the shaft 75 to vary the positions of the diverter arms 77, a weight member 80, best shown in FIG. 3, is secured in depending relation to the shaft 75. The weight member 80 comprises a generally vertically disposed rod 81 having its upper end 82 bent upwardly and rearwardly and secured, as by welding, to the shaft 75. The rod 81 extends outwardly through an opening in the front wall means of the fertilizer hopper above the normal level of fertilizer therein, and then extends downwardly.

The lower end of the rod 81 is apertured to receive a cotter 83 that fixes a socket 84 to the rod 81. The socket 84 is welded to a stem 85 on which a weight 86 is supported.

In operation, when the grain drill is driven uphill, for example, the weight 86 swings rearwardly (FIG. 5) and thus disposes the fertilizer engaging diverter portion 78 closer to the shaft 41 so as to divert a greater quantity of the fertilizer forwardly toward the upper edge of the gate 24. Conversely, when the grain drill is driven downhill (FIG. 6), the weight 86 swings forwardly and causes the diverter section 78 to move away from the shaft, thereby reducing the amount of fertilizer that is delivered upwardly toward the gate 24.

Figure 5:
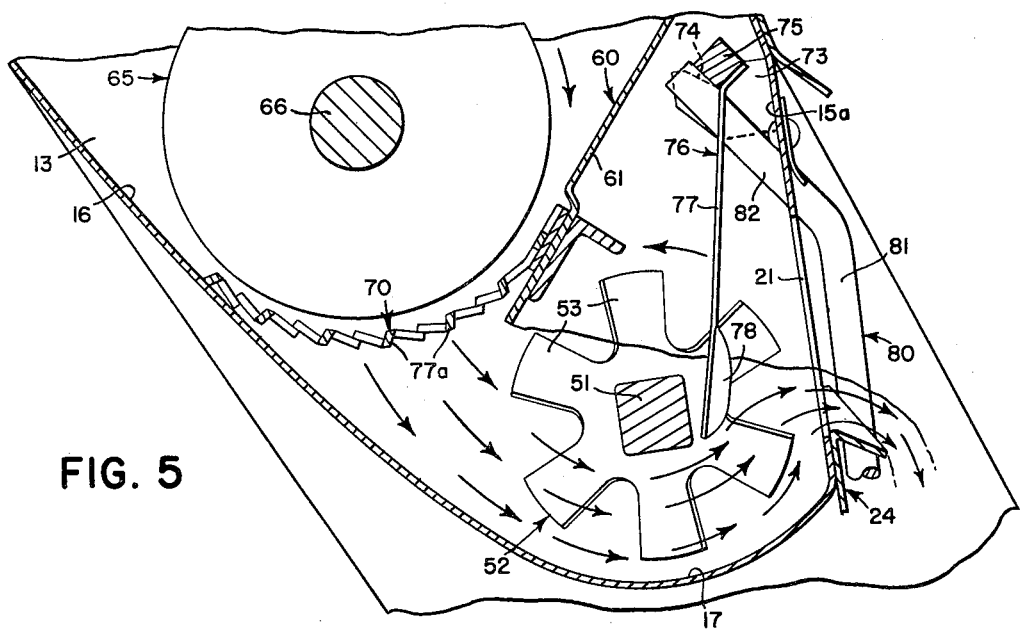
FIG. 5 is a fragmentary view, showing the position of the diverter when the implement is driven uphill.
Figure 6:
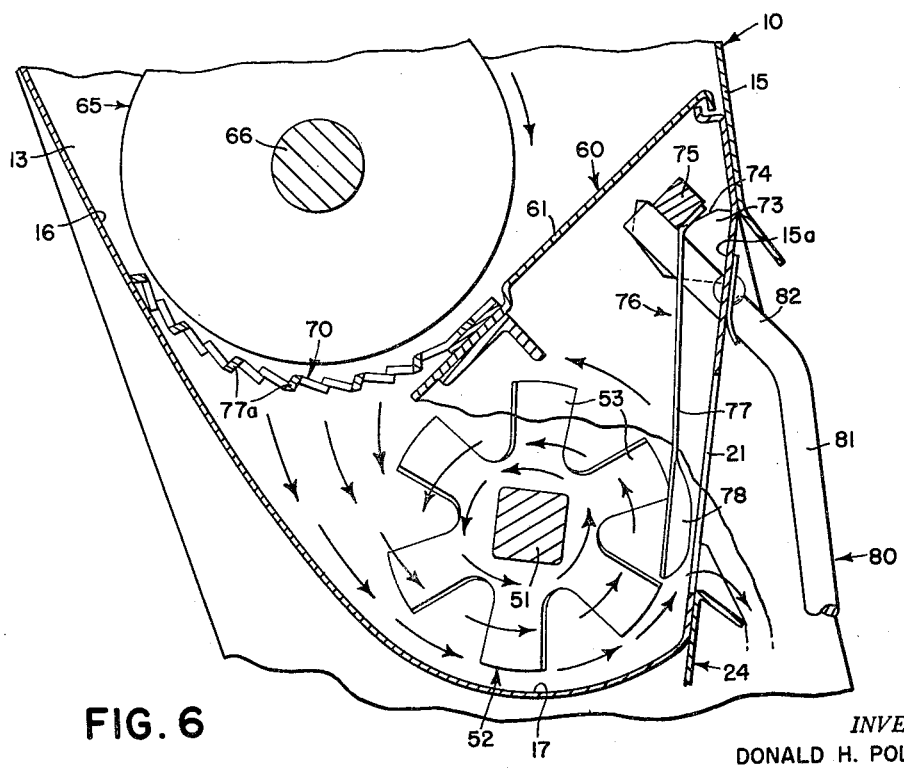
FIG. 6 is similar to FIG. 5 and shows the position of the diverter when the implement is driven downhill.

From FIGS. 1, 5, and 6, it will also be observed how, due to the action of the agitator 65, fertilizer that is screened by the expanded metal member 70 is fed downwardly into the lower portion of the hopper at all times. If the gate 24 is in a relatively high position, only a small amount of the fertilizer is discharged thereover, but if the gate is in a relatively low position, appreciably greater quantities are discharged over the gate or slide 24. It will also be observed that the lower edge of the baffle plate 61 serves as means in the nature of an automatic cutoff in that the level of the fertilizer in the lower portion of the hopper is largely determined thereby and automatically maintained by the agitator at that point, irrespective of whether large or small quantities of fertilizer are delivered by the impeller wheels over the adjustable gate or slide 24. That is to say, if only small quantities are discharged from the hopper, only a small quantity of fertilizer passes through the screen 70 into the lower portion thereof, whereas if larger quantities are discharged by the impeller feed means, correspondingly larger portions of fertilizer pass downwardly through the screen, thus maintaining the level of the fertilizer in the lower part of the hopper at about the same point.

Fertilizer that discharges over the lips or notches 29 in the gate 24 is directed downwardly by spouts 90. Each of the spouts includes a tubular part that at its upper end is shaped to fit close against the hopper wall 15a. The latter has a key hole slot 91 formed therein with the larger end upward. A spring clip 92 shaped as shown in FIG. 7 is riveted, as at 93, to the upper end of the tube 90 that fits into the key hole slot 91. A projection 97 on the clip 92 is adapted to enter the larger part of the key hole slot 91 to yieldably hold the rivet in the lower part of the slot 91, thus retaining the spout 90 in place.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desired to secure by Letters Patent is:

1. In a fertilizer distributor movable over the ground in a normal forward direction, a hopper having a discharge opening above the bottom thereof, means supporting said hopper for travel in said direction normally in a level position parallel to the ground, means to supply fertilizer to the bottom of the hopper in quantities sufficient to cause the fertilizer to fall by gravity through said opening, tilting of said hopper out of a level position tending to cause the quantity of fertilizer falling through said opening to increase or decrease, according to whether the hopper is tilted in one direction or the other out of said level position, and means responsive to variations in the position of the hopper from the horizontal in one direction or the other for varying the rate of movement of fertilizer toward said discharge opening so as to offset a variation in the position of the hopper.

2. A fertilizer distributor normally movable in a fore-and-aft direction, comprising a hopper having a discharge opening, a rotatable part disposed within the hopper to direct material generally toward said discharge opening, said part being spaced from said discharge opening, a diverter mounted in said space within the hopper and movable therein toward or away from the material directing part to divert more or less material away from said opening, and means responsive to changes in the position of the hopper from a horizontal position in said fore-and-aft direction for varying the position of the diverter relative to said material directing part.

3. A fertilizer distributor comprising a hopper having fore-and-aft spaced apart side walls and a bottom wall, there being a discharge opening in one of said side walls above the bottom wall, means for feeding fertilizer into the bottom portion of the hopper so as to maintain a quantity of fertilizer above the level of said discharge opening, whereby fertilizer is in a position to flow by gravity from said discharge opening, rotatable means in the bottom portion of the hopper between said spaced apart side walls to lift fertilizer from the bottom of the hopper upwardly toward said discharge opening, a diverter member swingably mounted in said hopper between said rotatable means and said discharge, and a weighted arm swingable relative to said hopper and connected with diverter member and thereby responsive to tilting of the hopper in a fore-and-aft direction varying the proportion of fertilizer directed toward said discharge opening so as to maintain substantially constant the rate of flow of fertilizer from said discharge opening notwithstanding tilting of the hopper.

4. A fertilizer distributor comprising a hopper having side walls and a bottom wall and normally operated in a position that is generally horizontal in a fore-and-aft direction, there being a discharge opening in one of said side walls of the hopper above the bottom wall, means for feeding fertilizer into the bottom portion of the hopper, fertilizer lifting means disposed in the lower portion of said hopper below said discharge opening and rotatable about a generally horizontal axis that is transverse relative to said fore-and-aft direction, said lifting means being rotatable in a direction to lift fertilizer up and cause it to fall by gravity out through said discharge opening, a diverter mounted in the lower portion of said hopper and shiftable therein to cause more or less of the fertilizer to be directed by said rotatable means toward the discharge opening, and means responsive to changes in the position of the hopper from its normal horizontal position in a fore-and-aft direction and connected with said diverter for changing the position of the latter relative to said fertilizer lifting means.

5. A fertilizer distributor comprising a hopper having side walls and a bottom wall, there being a discharge opening in one of said side walls above the bottom wall, means for feeding fertilizer into the bottom portion of the hopper so as to maintain a quantity of fertilizer above the level of said discharge opening, whereby fertilizer is in a position to flow by gravity from said discharge opening, fertilizer lifting means disposed adjacent the bottom of the hopper below said opening and rotatable about a generally horizontal axis and in a direction to shift fertilizer material from the bottom of the hopper upwardly toward said discharge opening, there being a space between said fertilizer lifting means and said discharge opening, and a pivoted diverter vane disposed in said space between said fertilizer lifting means and said opening, said diverter vane being movable generally horizontally toward one or the other of said opening and said lifting means for varying the proportion of material directed to said opening.

6. A fertilizer distributor comprising a hopper having side walls and a bottom wall, there being a discharge opening in one of said side walls above the bottom wall, means for feeding fertilizer into the bottom portion of the hopper so as to maintain a quantity of fertilizer above the level of said discharge opening, whereby fertilizer is in a position to flow by gravity from said discharge opening, said fertilizer feeding means comprising means rotatable in the hopper driven in a direction to lift fertilizer up to a point above the level of said discharge opening, there being a space between said rotatable means and said discharge means, a diverter movably supported in said hopper and having a part disposed adjacent said fertilizer lifting means and movable in said space toward or away from said fertilizer lifting means so as to divert varying amounts of fertilizer away from said opening, and means connected with said diverter to change the position thereof.

7. A fertilizer distributor comprising a hopper having side walls and a bottom wall, there being a discharge opening in one of said side walls above the bottom wall, means for feeding fertilizer into the bottom portion of the hopper so as to maintain a quantity of the fertilizer above the level of said discharge opening, whereby fertilizer is in a position to flow by gravity from said discharge opening, fertilizer feeding rotors in the lower portion of the hopper to direct fertilizer out through said opening, a generally vertical vane shiftable to different positions between said rotors and said opening and acting to divert varying quantities of fertilizer away from said opening, and a swingable weight member fixedly connected with said vane to shift the latter toward or away from said rotors.

References Cited in the file of this patent
UNITED STATES PATENTS

| | | |
|---|---|---|
| A.I. 303 | Glover | Nov. 20, 1860 |
| Re. 24,622 | Masters et al. | Mar. 17, 1959 |
| 84,458 | Wood | Nov. 24, 1868 |
| 251,226 | Hart | Dec. 20, 1881 |
| 336,496 | Sombart | Feb. 16, 1886 |
| 949,395 | Eaton | Feb. 15, 1910 |
| 1,617,273 | Pequet | Feb. 8, 1925 |
| 2,804,998 | Kirschmann | Sept. 3, 1957 |